United States Patent
Hou-Shin et al.

(10) Patent No.: US 8,649,450 B2
(45) Date of Patent: Feb. 11, 2014

(54) METHOD AND APPARATUS FOR GENERATING A PREAMBLE FOR USE IN CABLE TRANSMISSION SYSTEMS

(75) Inventors: Chen Hou-Shin, East Brunswick, NJ (US); Gao Wen, West Windsor, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 289 days.

(21) Appl. No.: 12/998,442

(22) PCT Filed: Oct. 20, 2009

(86) PCT No.: PCT/US2009/005717
§ 371 (c)(1),
(2), (4) Date: Apr. 19, 2011

(87) PCT Pub. No.: WO2010/047787
PCT Pub. Date: Apr. 29, 2010

(65) Prior Publication Data
US 2011/0194625 A1     Aug. 11, 2011

Related U.S. Application Data (60) Provisional application No. 61/196,746, filed on Oct. 20, 2008.

(51) Int. Cl.
*H04L 27/28* (2006.01)
(52) U.S. Cl.
USPC ........................................................ 375/260
(58) Field of Classification Search
USPC .......................................... 375/260, 261, 298
See application file for complete search history.

(56) References Cited

U.S. PATENT DOCUMENTS

| | | | |
|---|---|---|---|
| 2005/0111522 A1 | 5/2005 | Sung et al. | |
| 2007/0070179 A1 | 3/2007 | Van Rooyen | |
| 2009/0103649 A1 | 4/2009 | Vare et al. | |
| 2009/0304023 A1 | 12/2009 | Stadelmeier | |
| 2011/0158334 A1* | 6/2011 | Arambepola et al. | ........ 375/260 |

FOREIGN PATENT DOCUMENTS

| | | |
|---|---|---|
| CN | 1941763 | 4/2007 |
| EP | 1202596 | 5/2002 |
| EP | 1729467 | 12/2006 |
| EP | 1770937 | 4/2007 |
| JP | 2007235308 | 9/2007 |
| JP | 2009296586 | 12/2009 |
| KR | 20050049149 | 5/2005 |

(Continued)

OTHER PUBLICATIONS

DVB, "Frame Structure Channel Coding and Modulation for a Second Generation Digital Terrestrial Television Broadcasting Systems (DVB-T2)", DVB Documnet A122, Jun. 2008.

(Continued)

*Primary Examiner* — Don N Vo
(74) *Attorney, Agent, or Firm* — Robert D. Shedd; Jeffrey M. Navon (57) ABSTRACT

A method and apparatus for generating a preamble for use in DVB-C2 cable transmission standard is provided. The preamble has multiple functions including frame timing, synchronization, frequency offset estimation, system information signaling and initial channel estimation. In accordance with an implementation, a complementary sequence is inserted as a header and the complementary sequence and system signaling bits are mapped into modulation symbols for transmission on allocated even channels only of the cable transmission system.

28 Claims, 5 Drawing Sheets

(56) References Cited

FOREIGN PATENT DOCUMENTS

| WO | WO9810548 | 3/1998 |
| WO | WO2006137708 | 12/2006 |
| WO | WO2007078146 | 7/2007 |
| WO | WO2009096720 | 8/2009 |
| WO | WO2010047513 | 4/2010 |

OTHER PUBLICATIONS

Tsai et al., "Adaptive Channel Estimation for MB-OFDM Systems in Multi-Access Interfering Environments", 2008 IEEE.

Challapali et al., "Evolution of Spectrum-Agile Cognitive Radios: First Wireless Internet Standard and Beyond", WICON 06, The 2nd Annual International Wireless Internet Conference, Boston, MA, Aug. 2-5, 2006.

* cited by examiner

METHOD AND APPARATUS FOR GENERATING A PREAMBLE FOR USE IN CABLE TRANSMISSION SYSTEMS

CROSS REFERENCE TO RELATED APPLICATIONS

This application claims the benefit, under 35 U.S.C. §365 of International Application PCT/US2009/005717 and filed Oct. 20, 2009, which was published in accordance with PCT Article 21(2) on Apr. 29, 2010, in English and which claims the benefit of U.S. provisional patent application No. 61/196,746, filed on Oct. 20, 2008, in English.

TECHNICAL FIELD

The present principles relate to cable transmission systems and techniques. More particularly, it relates to a preamble design for the DVB-C2 standard used for cable channel transmissions.

BACKGROUND

Recently, DVB-C2 (next generation digital cable transmission system being developed by the DVB Project) Standard is under progress. An agreement is made that DVB-C2 shall reuse the content of DVB-T2 Standard as much as possible. As a result, OFDM technique will be adopted as well as the coding technique (BCH+LDPC) specified in DVB-T2 Standard. However, it must be noted that DVB-T2 Standard is designed for using in the terrestrial wireless channel while the DVB-C2 Standard is designed for using in the cable channel. Cable channels differ from wireless channels in two aspects. First, cable channel is a high quality (high SNR) channel with only a few weak echoes. Second, the wireless spectrum assigned for TV broadcasting is confined by FCC while we can use the spectrum with high freedom in the cable networks. Consequently, the signal frame structure and preambles used in DVB-T2 may not be suitable to be reused in DVB-C2 Standard.

SUMMARY

According to an implementation, the method for generating a preamble for use in a cable transmission medium, includes inserting a complementary sequence as a header in beginning carriers, protecting signaling bits of the system with error correction codes, mapping the complementary sequence and signaling bits into modulation symbols on allocated even carriers only, where the mapped modulation symbols form the preamble in each frame, and transforming the formed preamble to a time domain.

According to another implementation the apparatus for generating a preamble for use in a cable transmission system includes a processor for inserting a complementary sequence as a header in beginning carriers, protecting signaling bits of the system with error correction codes and mapping the complementary sequence and protected signaling bits into modulation symbols to form the preamble, and a modulator configured to allocate even carriers only and enable the transmission of the preamble on the allocated even carriers.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to methods and an apparatus for Preamble design in DVB-C2 standard used in digital cable transmission environments.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In accordance with one implementation, a preamble is designed for use in DVB-C2 Standard. The preamble of the present principles has multiple functions including frame timing synchronization, frequency offset estimation, system information signaling, and initial channel estimation.

Those of skill in the art will recognize that some concepts addressed in this disclosure include, but are not limited to, DVB-C2, Preamble design, Signaling, and Synchronization.

The preamble design of the present principles is motivated by the need for an efficient preamble structure for use in cable channels. In accordance with one preferred implementation, the preamble structure of the present principles possesses the following functions:

1. Allow reception at any tuning position to support Partial Reception in the receiver side when the Channel Bonding technique is applied in the transmitter side;
2. C2 system identification, preamble identification and frame timing synchronization;
3. Frequency offset estimation;
4. Signaling of system information (guard interval length, constellation, coding rate etc.); and
5. Initial channel estimation.

Basic Preamble Structure

Figure 1:
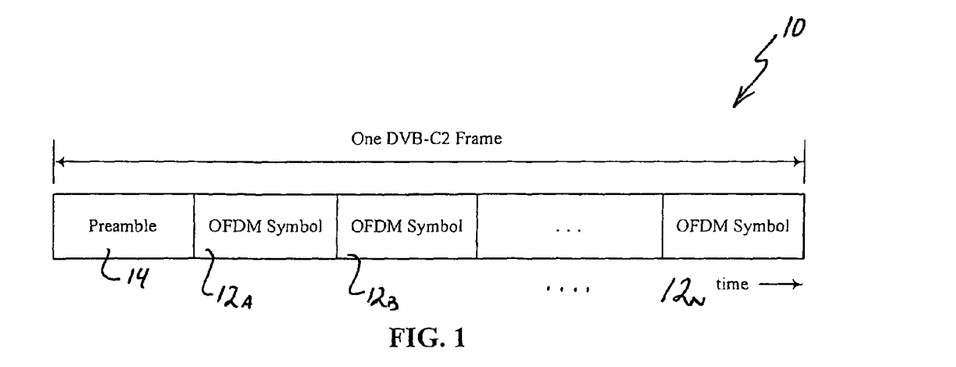
FIG. 1 is representation of the frame structure of DVB-C2 signals.

As shown in FIG. 1, a DVB-C2 frame 10 consists of a bunch of OFDM symbols 12a-12n and the first OFDM symbol is a preamble symbol 14 which is used to perform synchronization and signaling of C2 system. In the example described, the FFT size of the OFDM modulation is selected as 4 k. Thus, in accordance with this exemplary implementation, the preamble is designed using OFDM modulation with 4 k carriers.

Figure 2A:
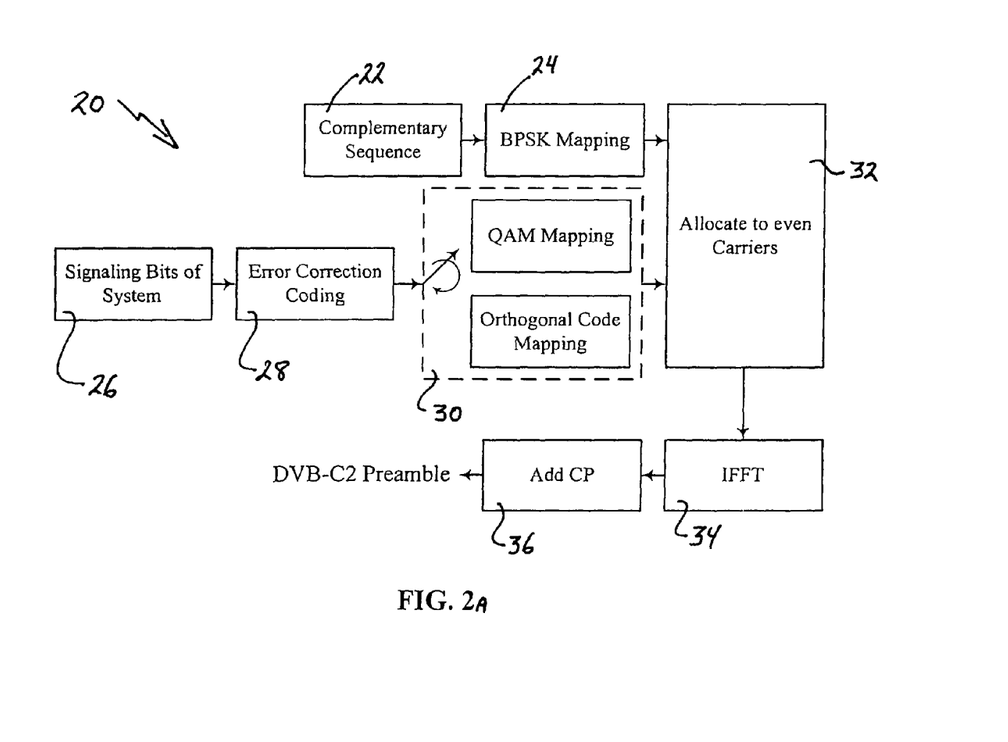
FIGS. 2a-2c show block diagrams illustrating the method for generating a preamble according to various implementations of the present principles.

FIG. 2a shows the block diagram of an exemplary method 20 of generating the preamble. In this example, a complementary sequence 22 is inserted in the beginning carriers as a header (see for example, FIG. 3) and then mapped 24 into modulation symbols (e.g., BPSK mapping). Those of skill in the art will recognize that the complementary sequence is part of the standard and can be referred to at Table 63 in the Draft ESTY EN 302 755 V1.1.1_0.2(2008-10). Functionally, the mapped symbols are assigned to the allocated even carriers, thus the mapping occurs before the allocation of the even carriers.

Figure 5:
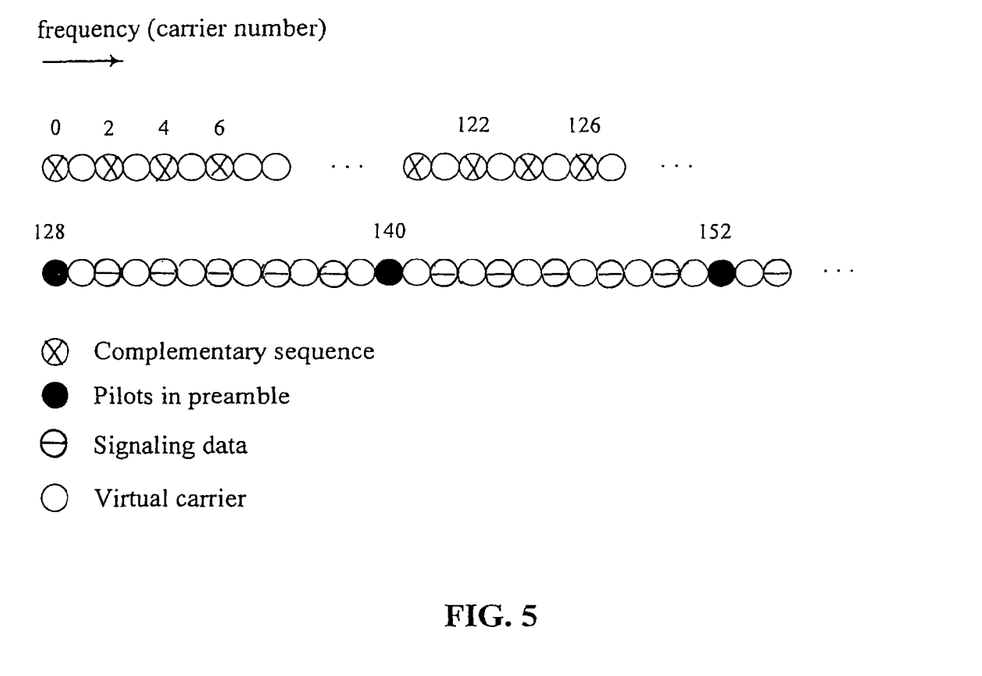
FIG. 5 is a representation of a structure of the preamble signals according to an implementation of the present principles.
Figure 6:
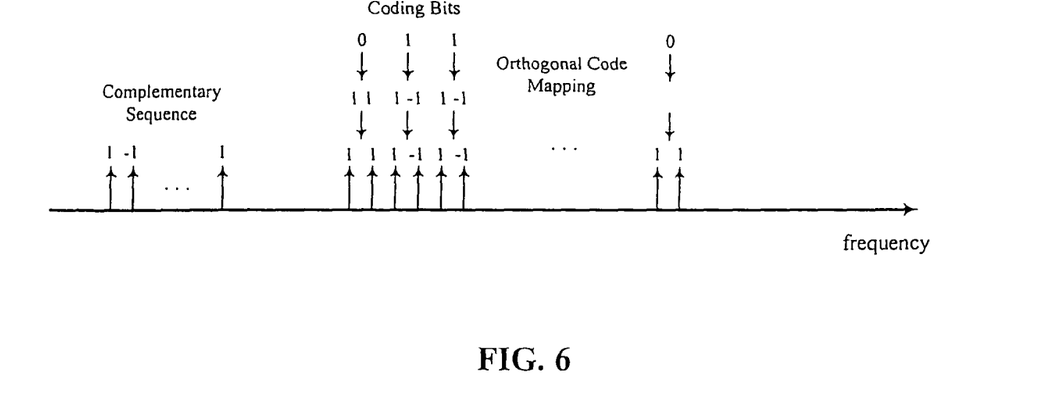
FIG. 6 is an example of a preamble using Walsh codes according to an implementation of the present principles.

The signaling bits of system information 26 are protected by an error correction code 28 and then mapped into modulations symbols of either orthogonal codes or QAM symbols (30). FIG. 5 shows an example of a structure of the preamble symbols. In accordance with one implementation, those of skill in the art will recognize that pilot carriers can be used to perform channel estimation. FIG. 6 shows another example of using Walsh code of length 2 to convey 1 bit. The information bit 0 is transmitted by the code (1,1) and the information bit 1 is transmitted by the code (1,−1). Once the signal of bits of the system are transmitted, the modulator allocates the system bit information and complementary sequence to the even carriers 32. It is important to note that the according to the preferred implementation of the present principles, only even carriers are used and the odd carriers are left as virtual carriers. Finally, the preamble signal is transformed to the time domain by IFFT operation 34 and depending on the desired implementation, a cyclic prefix (CP) may be added 36 to complete the generation of the DVB-C2 preamble.

Figure 2B:
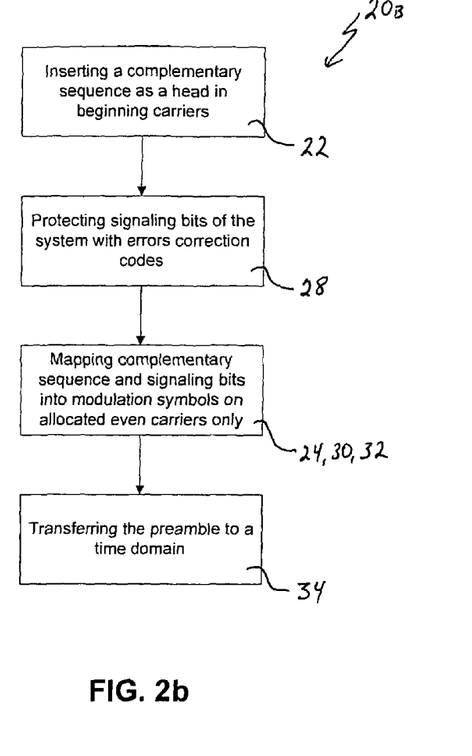

FIG. 2b shows the method steps 20b as derived from the block diagram of FIG. 2a. In this implementation, the complementary sequence is inserted as a header in beginning carriers 22, the signaling bits are protected with error correction codes 28, and both the complementary sequence and signaling bits are mapped into modulation symbols (24, 30), and then they are allocated (32) to the even carriers only.

Figure 2C:
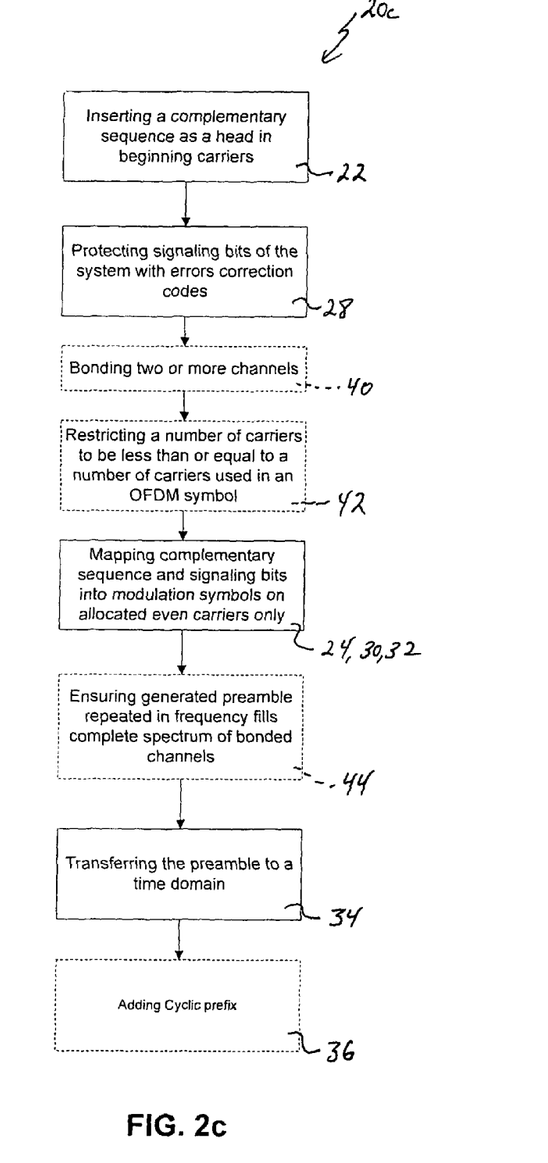

FIG. 2c shows another implementation of the method 20c according to the present principles. In this implementation, consideration is made for when two or more channels in the cable transmission are bonded (40). In this instance, and as described below) it is necessary to add the step of restricting (42) the number of carriers to be less than or equal to the number of carriers used in an OFDM symbol. The added step of ensuring (44) the generated preamble repeated in frequency fills the complete spectrum of the bonded channels is also required.

Figure 7:
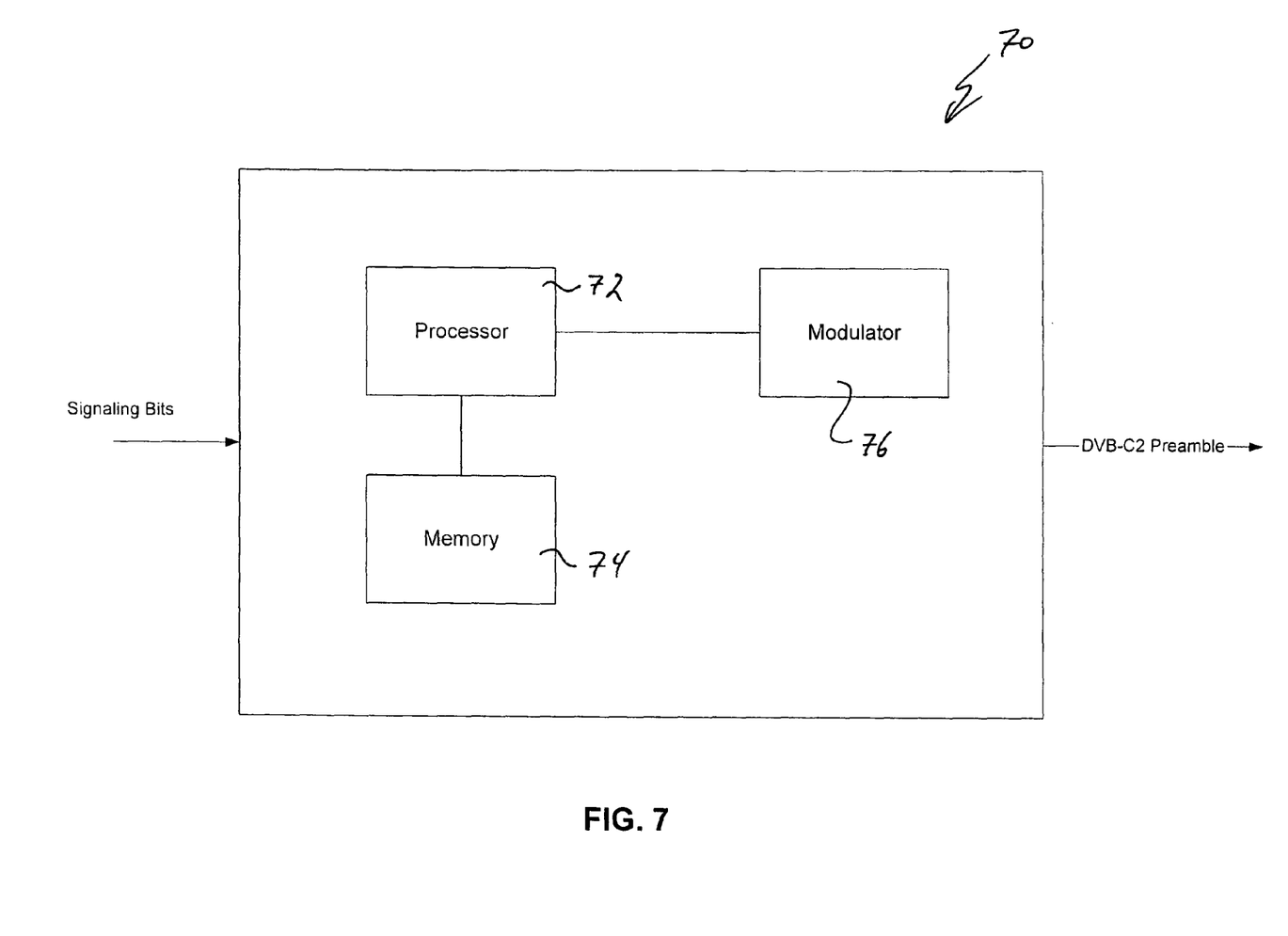
FIG. 7 is a block diagram of an apparatus for implementing the preamble generation according to an embodiment of the present principles.

FIG. 7 shows an apparatus 70 for generating the DVB-C2 preamble according to the present principles. A processor 72 in communication with a memory 74 and modulator 76 controls the preamble generation by utilizing the below criterion and performing the steps for the same. Those of skill in the art will recognize that memory 74 can contain the variations in complementary sequences needed and the processor 72 will make determinations as to which complementary sequences are used during preamble generation so as to coordinate the same with the desired cable transmission application.

According to one preferred implementation, there are three criteria for the preamble structure:

1. The number of carriers used by the preamble, $K_p$ is confined by $$K_p \leq K_{total} \tag{1}$$

where $K_{total}$ is the number of carriers used in an OFDM symbol, e.g. $K_{total}=3409$ for 4K mode (FFT size=4096) specified in DVB-T2;

2. The preamble, which carries the information of signals transmitted in the spectrum of the bonding channels, cyclically fill the complete spectrum. Furthermore, the preamble will cover the whole 8 MHz, i.e., 3584 carriers defined in DVB-T2. This criterion can be expressed as $$X_i[k] = P[(i \cdot 3584+k)\%K_p], i=0,1,\ldots, k=0,1,\ldots, 3583 \tag{2}$$

where $X_i[k]$ is the transmitted signal in the $k^{th}$ carrier of the $i^{th}$ bonding channel and $P[l]$ is the preamble signal in the $l^{th}$ carrier, $0 \leq l \leq K_p$; and 3. Only the even carriers are modulated while the odd carriers are left as virtual carriers.

The first and second criteria come up with the need to support Partial Reception in the receiver side when the Channel Bonding technique is applied in the transmitter side. By using the Channel Bonding technique, several channels are bonded together to provide a large spectrum. Thus, this large spectrum can be divided into subchannels or data slices according to the required bandwidth of individual service. To be more flexible, a subchannel or a data slice is allowed to start at any point (carrier) within the bonding spectrum. Then, the preamble has to be received and detected by a receiver at any tuning position within the bonding spectrum. It is worth noting that the guard band cannot be removed or reduced if Partial Reception is implemented in the receiver. Thus, the spectral efficiency does not have an apparent improvement when the Channel Bonding technique is used. When Channel Bonding and Partial Reception are not used, or there is a restriction for a subchannel such that a subchannel is not allowed to cross the boundary of two neighboring bonding channels, the first two criteria can be released. The third criterion is made so that the preamble has a repetition structure in time domain to enable fast preamble identification. This kind of structure is also used in IEEE 802.11 and 802.16. The repetition structure can be easily understood. Consider that we modulate even carriers only and leave all odd carriers as virtual carriers. From inverse DFT equation, $$x[n] = \frac{1}{N} \sum_{k=0}^{N-1} X[k] e^{j2\pi k n/N} \quad (3)$$

Since $X[k]=0$ for odd carriers, we can rewrite (3) as $$x[n] = \frac{1}{N} \sum_{k=0}^{N/2-1} X[2k] e^{j2\pi(2k)n/N} \quad (4)$$

It is clear from (4) that $x[n]=x[N/2+n]$, $n=0, 1, \ldots, N/2-1$. This structure can be used to perform frame timing synchronization and fractional frequency offset estimation. Although the guard interval can also achieve these two goals, the performance is degraded when the length of guard interval is not greatly larger than the channel length.

Preamble Structure for Frequency Offset Estimation

Figure 3:
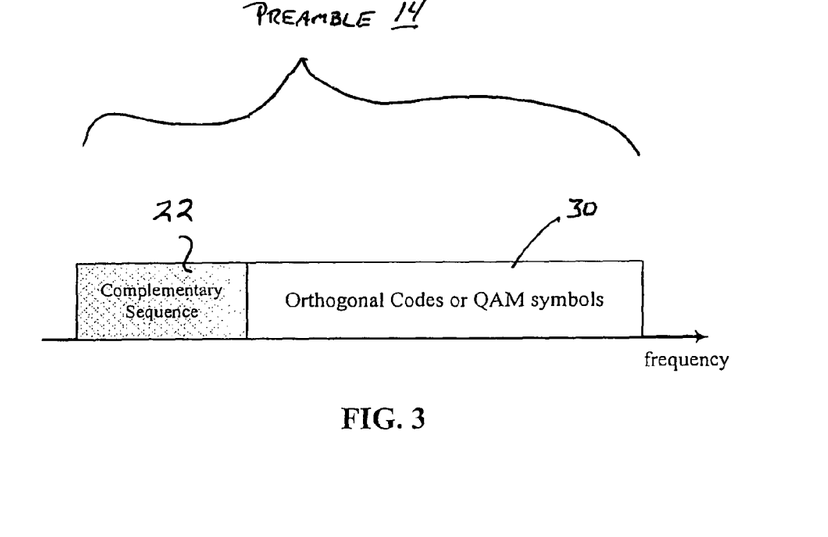
FIG. 3 is a representation of the composition of a DVB-C2 preamble in a frequency domain.
Figure 4:
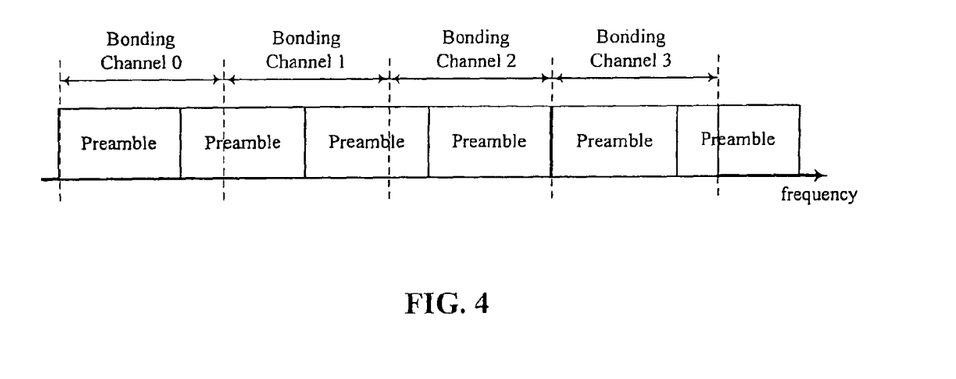
FIG. 4 is an example of a cyclic representation of the preamble with bonded channels according to an implementation of the present principles.

If we normalize frequency offset by carrier spacing, the frequency offset can be separated as an integer part and a fractional part. The fractional part of frequency offset can be estimated by the time domain repetition structure. The estimation of integer part frequency offset has to rely on frequency domain pilots due to phase ambiguity problem for time domain signals. In at least one implementation in this disclosure, a complementary sequence is allocated in the frequency domain as shown in FIG. 3 to assist integer frequency offset estimation. The length of the complementary sequence shall be selected according to the channel condition. There are 8 orthogonal complementary sequences of length 64 and 16 orthogonal complementary sequences of length 256, specified in DVB-T2 for the P1 preamble. Each of the complementary sequences of length 64 is made by a concatenation of a set of 8 complementary sequences of length 8.

The 8 complementary sequences of length 64 are made by 8 orthogonal sets of complementary sequences. The complementary sequences of length 256 are made by the same way. They are made by 16 orthogonal sets of complementary sequences of length 16. For DVB-C2, one of the sequences with a length of 64 (124721741D482E7B in hexadecimal notation), is selected and allocated in the beginning of the preamble as shown in FIG. 5 and FIG. 6. The complementary sequence is allocated in the even carriers of the first 128 carriers. Note that we use a complementary sequence instead of 8 orthogonal complementary sequences which can convey 3 bit information implemented in DVB-T2. The processing time to estimate the integer part of frequency offset is decreased by doing so.

Preamble Structure for Signaling of System Information

Two signaling methods are provided in the preamble.

1. Re-use P2 preamble and scattered pilot pattern PP5 specified in DVB-T2 Standard.

In this method, scattered pilot pattern PP5 is applied to the DVB-C2 system. However, there is a pilot for every 12 carriers in the preamble as shown in FIG. 5. The signaling bits are protected by BCH and LDPC codes and then mapped to QAM symbols in available even carriers. Signaling by this method can allow more information bits transmitted but the decoding complexity is larger than the signaling method described below.

2. Use orthogonal codes to convey signaling bits of system information.

According to the channel model recommended by DVB-C2 system evaluation (SE) group, the rms delay spread $\sigma_\tau$ is equal to 97.5 ns. The coherence bandwidth which is defined as the bandwidth over which the frequency correlation function is above 0.9 is approximately $$B_c \approx \frac{1}{50\sigma_\tau} = 205 \text{ kHz}. \quad (5)$$

Consider the 4 k mode defined in DVB-T2, the subcarrier spacing is approximately 2.232 kHz. Thus, we can assume that the neighboring 205/2.232=91 carriers possess equal gain and linear phase. Thus, it is reasonable to assume that for a small number of neighboring subcarriers, e.g., 16, they have the same frequency domain channel gain coefficients. Taking advantage of this property, we can transmit orthogonal codes in neighboring subcarriers and decode them in the receiver by simply performing correlation. For instance, the information bit 0 is transmitted by the code (1,1) and the information bit 1 is transmitted by the code (1,−1). In addition, the bits conveying system information should ideally be error free. Therefore, an error correction code added as shown in FIG. 2. The selection of the orthogonal codes and error correction codes depends on the number of required system information bits and the implementation complexity. The Walsh Code of length 8 is selected here for DVB-C2 preamble. The mapping of bits to Walsh code is given in Table 1 below:

TABLE 1

| Bits | Walsh Code |
|------|------------|
| 000  | 1, 1, 1, 1, 1, 1, 1, 1 |
| 001  | 1, −1, 1, −1, 1, −1, 1, −1 |
| 010  | 1, 1, −1, −1, 1, 1, −1, −1 |
| 011  | 1, −1, −1, 1, 1, −1, −1, 1 |
| 100  | 1, 1, 1, 1, −1, −1, −1, −1 |
| 101  | 1, −1, 1, −1, −1, 1, −1, 1 |

TABLE 1-continued

| Bits | Walsh Code |
|---|---|
| 110 | 1, 1, −1, −1, −1, −1, 1, 1 |
| 111 | 1, −1, −1, 1, −1, 1, 1, −1 |

Consider 4 k mode defined in DVB-T2 and select $K_{total}$ equaling to 3408 (3409 in DVB-T2), from equation (1), the number of carriers in a preamble is $K_p \leq 3408$. In order to carry as much information as possible and fit the coding structure, $K_p$ is selected to be 3200. Thus, except the first 128 carriers which are allocated using a complementary sequence and, from carrier index 128 to 3200, 192 sets of Walsh codes with length 8 are transmitted in even carriers. It is also possible to leave a small gap between the complementary sequence and Walsh code sets to have better performance of frequency offset estimation. A Walsh code of length 8 is able to convey 3 bits of information. Therefore, 576 information coding bits are transmitted. The Reed-Muller Code, RM(64,42,8) is selected to protect signaling bits of system information. Thus, the preamble can carry 378 signaling bits of system information. The total 576 bits are divided into 9 sets of 64 bits to carry 9 sets of 42 signaling bits of system information. The selection of the Reed-Muller code is due to its simplicity of decoding. If Walsh Code with length 4 and a more robust error correction code e.g., Reed-Solomon code are used, it is possible to carry more than 600 signaling bits. It is worth noting that by using this scheme to transmit signaling bits, no channel estimation is required in decoding signaling bits. Thus, the time delay is greatly reduced.

I. Preamble Structure for Initial Channel Estimation

If we use the first signaling method, the channel gain coefficients on those pilot carriers in the preamble can be reuse in the following OFDM symbols. If the second signaling method is used, after we decode the system information bits, we can encode the decoding bits to get the original bits and thus transmitted orthogonal codes. Then, the channel gain coefficients in those modulated subcarriers can be easily obtained. It is worth noting that we get a much larger number of channel gain coefficients than what we get using the first signaling method. Since the cable channel is a stable channel, the channel gain coefficients obtained from the preamble are very helpful for channel estimation. The C2 system will be benefited by this initial channel estimation.

Those of skill in the art will recognize that the present principles provide several advantages over known cable transmission techniques. Some examples of those advantages are:

1. The preamble designed in at least one implementation of this disclosure provides an N/2-point repetition structure in time domain where N is the size of FFT. This time domain structure can be used to perform preamble identification, frame timing synchronization and fractional frequency offset estimation in the same time. In addition, the required complexity is low and the performances of frame timing synchronization and fractional frequency offset estimation are better than CP-based method;

2. One of the signaling methods provided in to decode signaling bits transmitted in the preamble. Thus, the complexity is reduced and the delay time in processing the preamble is also reduced at least one implementation in this disclosure does not require channel estimation;

3. The designed preamble using orthogonal codes to transmitted signaling bits can provide additional initial channel gain coefficients (frequency domain channel gain coefficients in even carriers); and 4. The complexity of decoding the designed preamble structure in at least one implementation in this disclosure is smaller and hence the processing time (initial delay) for decoding the preamble is much shorter.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A method for generating a preamble for use in a cable transmission system, the method comprising the steps of:

selecting a complementary sequence;

receiving signaling bits representing system information and encoding said signaling bits with an error correction code to produce encoded signaling bits;

mapping the complementary sequence and encoded signaling bits into modulation symbols;

using the modulation symbols to modulate allocated even carriers only of the frequency domain representation of an OFDM symbol contained in a frame of the cable transmission signal, wherein said cable transmission signal is comprised of a plurality of frames, said frame is comprised of at least one OFDM symbol, said OFDM symbol forms the preamble in each frame and the modulation symbols from the complementary sequence are assigned to the beginning carriers of the OFDM symbol as a header; and transforming the preamble to its time domain representation for transmission.

2. The method according to claim 1, further comprising setting a length of the complementary sequence according to cable carrier conditions.

3. The method according to claim 1, further comprising reserving at least one of the allocated even carriers for pilot carriers.

4. The method according to claim 3, further comprising using the pilot carriers to measure carrier conditions.

5. The method according to claim 3, further comprising re-using channel gain coefficients on the pilot carriers in following OFDM symbols.

6. The method according to claim 1, wherein said mapping further comprises using orthogonal codes to convey the signaling bits of system information.

7. The method according to claim 6, further comprising selecting the orthogonal codes in response to a number of required system information bits and channel conditions.

8. The method according to claim 6, wherein the orthogonal codes comprise Walsh codes.

9. The method according to claim 1, further comprising the step of adding a cyclic prefix to complete the generation of the preamble.

10. The method according to claim 1, further comprising:
bonding two or more channels; and
ensuring the generated preamble repeated in frequency fills a complete spectrum of the bonded channels.

11. The method according to claim 10, further comprising:
restricting a number of carriers used by said preamble to be less than or equal to a number of carriers used in an OFDM symbol.

12. The method according to claim 1, wherein said mapping further comprises using QAM modulation symbols to convey the signaling bits of system information.

13. The method according to claim 1, wherein said error correction codes comprises a Reed-Muller codes.

14. An apparatus for generating a preamble for use in a cable transmission system comprising:
a processor for inserting a complementary sequence as a header in beginning carriers, encoding the signaling bits of the system with an error correction code and mapping the complementary sequence and encoded signaling bits into modulation symbols to form the preamble; and
a modulator configured to allocate even carriers only and enable the transmission of the preamble on the allocated even carriers.

15. The apparatus of claim 14, wherein the processor further enables the bonding of two or more channels in the cable transmission system and ensures that the generated preamble repeated in frequency fills a complete spectrum of the bonded channels.

16. The apparatus of claim 15, wherein carrier conditions are measured using the pilot carrier.

17. The apparatus of claim 14, wherein the processor further restricts a number of carriers used by the preamble to be less than or equal to a number of carriers use in an OFDM symbol.

18. The apparatus of claim 14, wherein the processor reserves at least one of the allocated even carriers for use with a pilot carrier.

19. The apparatus of claim 14, wherein orthogonal codes are used to convey the signaling bits of system information.

20. The apparatus of claim 14, wherein the error correction codes comprises a Reed-Muller codes.

21. A method for receiving and processing a preamble for use in a cable transmission medium, the method comprising the steps of:
transforming the preamble from the time domain to the frequency domain;
retrieving modulation symbols from the allocated even carriers only of the frequency domain representation of the preamble;
retrieving a complementary sequence and encoded signaling bits from said modulation symbols wherein the complementary sequence is the header associated with the modulation symbols of the beginning carriers of the preamble; and
decoding the encoded signaling bits with an error correction decoder to retrieve the signaling bits representing system information.

22. The method according to claim 21, wherein at least one of the allocated even carriers is used for pilot carriers.

23. The method according to claim 22, wherein the pilot carriers are used to measure carrier conditions.

24. The method according to claim 22, wherein channel gain coefficients are used on the pilot carriers in following OFDM symbols.

25. The method according to claim 21, wherein said mapping further comprises using QAM modulation symbols to convey the signaling bits of system information.

26. An apparatus for receiving and processing a preamble for use in a cable transmission system comprising:
a demodulator configured to process even carriers only and enable the reception of the preamble on the allocated even carriers; and
a processor for retrieving the modulation symbols that form the preamble from said even carriers, retrieving a complementary sequence as a header in beginning carriers from said modulation symbols, retrieving encoded signaling bits from said modulation symbols and decoding the encoded signaling bits with an error correction decoder to retrieve signaling bits representing system information.

27. The apparatus of claim 26, wherein the processor receives at least one of the allocated even carriers used with a pilot carrier.

28. The apparatus of claim 26, wherein orthogonal codes are processed that have been used to convey the signaling bits of system information.

* * * * *